H. DOCK.
UNIVERSAL COUPLING.
APPLICATION FILED OCT. 11, 1907.
901,080.
Patented Oct. 13, 1908.
2 SHEETS—SHEET 2.
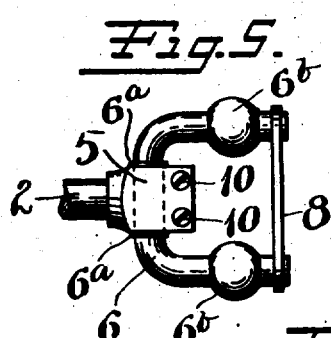
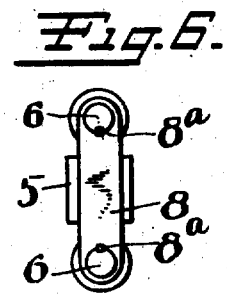
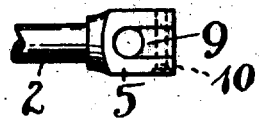
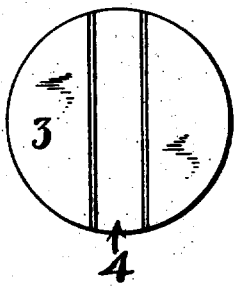
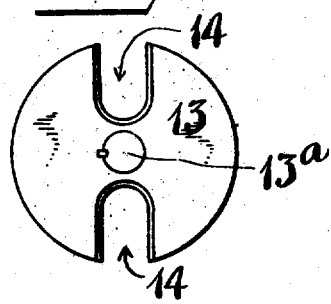
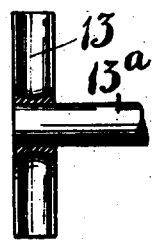
Witnesses:
Inventor
HERMAN DOCK

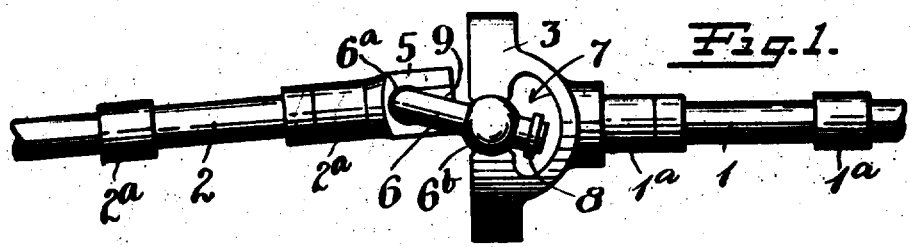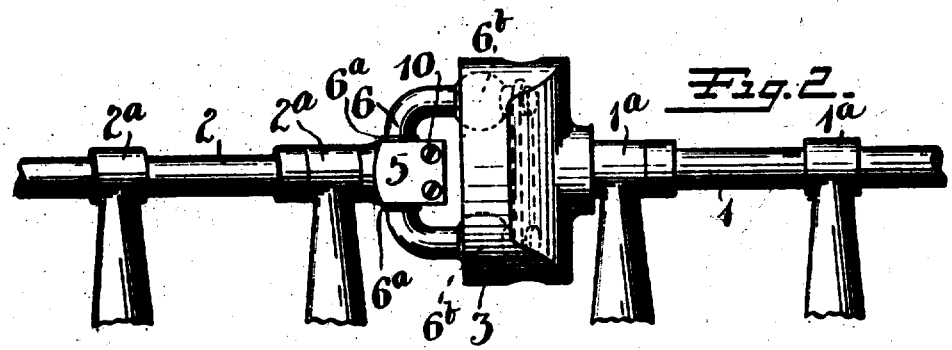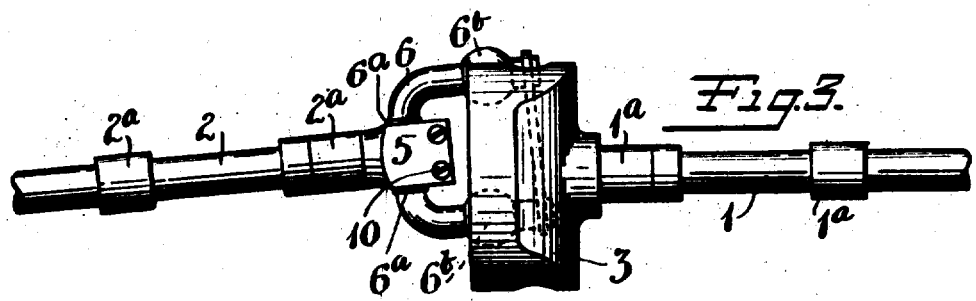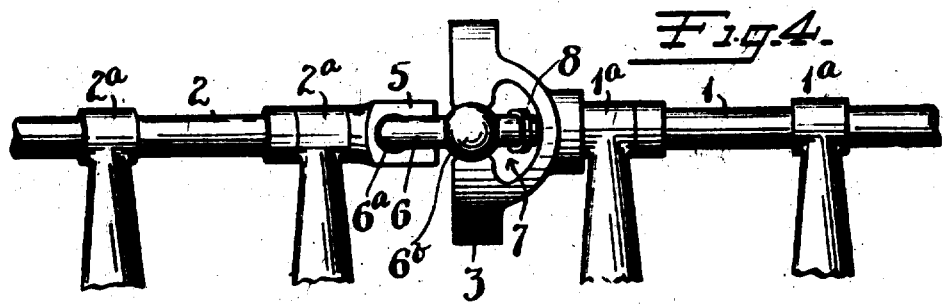

UNITED STATES PATENT OFFICE.

HERMAN DOCK, OF WYNCOTE, PENNSYLVANIA, ASSIGNOR TO DOCK GAS ENGINE COMPANY, OF NEW YORK, N. Y., A CORPORATION OF NEW JERSEY.

UNIVERSAL COUPLING.

No. 901,080.

Specification of Letters Patent.

Patented Oct. 13, 1908.

Application filed October 11, 1907. Serial No. 396,844.

*To all whom it may concern:*

Be it known that I, HERMAN DOCK, a citizen of the United States, residing at Wyncote, Montgomery county, Pennsylvania, have invented certain new and useful Improvements in Universal Couplings, of which the following is a full, clear, and exact description.

This invention relates to improvements in couplings for shafts, and consists in providing a universal coupling whereby two shafts may be connected at their ends whether said shafts are out of line or offset, whereby power may be economically and effectively transmitted from one to the other without undue friction, cramping or binding at the coupling or in the bearing boxes for said shafts.

In the drawings Figure 1 is a plan view of this invention. Fig. 2 is a side elevation of the parts as they appear in Fig. 1. Fig. 3 is a plan view, the parts being shown in a different position from that shown in Fig. 1, and the shafts being turned at an angle of 90° from that shown in Fig. 1. Fig. 4 is a side elevation of the parts as shown in Fig. 3. Fig. 5 is a side view of one section of the universal coupling shown in the preceding figures. Fig. 6 is an end view thereof. Fig. 7 is a view of a bearing box. Fig. 8 is an end view of the other section of the universal coupling shown in Figs. 1 to 4. Fig. 9 is a front or end elevation of a modification of the part shown in Fig. 8. Fig. 10 is a vertical section of the parts shown in Fig. 9.

1 may represent a driving shaft having suitable bearing boxes 1ª 1ª. 2 may represent a driven shaft having suitable bearing boxes 2ª 2ª. As shown in Fig. 1, these shafts are not only out of line, but the adjacent or connected ends are actually offset, thus representing a most extreme condition and one that the ordinary universal joint will not care for. 3 represents what may be termed a head carried by the driving shaft 1 and provided at its front side with a transverse guide-way. In the form shown in Figs. 1 to 8, the guide-way is continuous, in that it extends from edge to edge of the head 3. The guide-way is indicated at 4, in Fig. 8, and the opposite sides thereof are suitably concaved or otherwise shaped to receive the ends of the coupler section carried by the driven member. 5 is a bearing box on driven shaft 2. The coupler section 6 will be termed herein a yoke. In the particular form shown, this yoke is U-shaped and is held at its middle part in the box 5, suitable bearing shoulders 6ª 6ª being provided in this form to prevent side play. The ends of the yoke 6 project into the guide-way 4 of the head 3 and slidable and rotatable on the ends of the yoke are anti-friction end-bearing devices 6ᵇ 6ᵇ. The devices are preferably ball-like bodies, which take such a bearing between the walls of the guide-way 4 in the head 3 that they may rotate therein. Back of the guide-way, in Figs. 1 and 4, may be a clearance opening 7, for the ends of the yoke 6. Of course the particular shape of these various parts may be modified at will, but the arrangement shown represents one practical and effective form.

8 is a connector for the ends of the yoke 6. The size of said connector may be such as to add strength to the yoke member 6, and the same may be keyed thereto as indicated at 8ª 8ª, Fig. 6.

9 is a removable block in the box 5 whereby the yoke 6 may be removed from said box. This removable block 9 affords one means of permitting said parts to be assembled. 10—10 are screws for holding said block in place. Other means may, of course, be employed for permitting the assembling of said parts and for holding them in their assembled position.

Operation: In Figs. 1 to 4 the shafts 1 and 2 are represented as being not only out of line, but their ends are likewise offset to the same extent in all of said views, and these views show the position that the parts of the coupling take when said shafts have been turned approximately 90°. Referring first to Fig. 1, the yoke 6 is at an angle relatively to the axis of shaft 2, whereas the ball ends 6ᵇ will stand at approximately the middle position in the guide-way of the head 3. This is seen by reference to Fig. 2, which is a view of Fig. 1 taken from the side. The other extreme position of the coupling is indicated in Figs. 3 and 4, in which shafts 1 and 2 have been turned to an angle of 90° from that indicated in Figs. 1 and 2. In the position shown in Fig. 3, it now appears that the yoke and the ball ends have approached the limit of their excursion at one end of the guide-way in the head 3, and in this position the yoke is in the same plane as the axis of the driven shaft 2, as will be seen from Fig. 4. This extreme position may be taken by reason of the fact that the ball ends 6ᵇ have not only a rolling movement in the guide-way 4 but also a sliding movement on the yoke ends 6, as will be apparent from Fig. 3.

Since it appears that the sections of the coupling may take these extreme positions, and since the yoke 6 will turn freely in the box 5, it follows that power applied to shaft 1 will be transmitted through the yoke 6 to the driven shaft 2 with a minimum amount of friction, as compared, of course, with any connection of the universal type, which requires a suitable coupling to permit the ends of two shafts which are out of line, to be connected so that the rotary movement of one may be transmitted to the other. This invention differs from the ordinary universal joint of the well known "gimbal-ring" type and modifications thereof, in that not only may the shafts be arranged out of line but their ends may be offset, which is an extreme condition unattainable in the aforesaid ordinary type of universal connections.

As an illustration of one of the many modifications which may be availed of, reference is made to Figs. 9 and 10, in which instead of having the guide passage extend continuously across the head, said guide passage is interrupted. In these views 13 represents the head suitably fixed upon driving shaft 13ᵃ. 14—14 represent the guide passages, which enter the head from opposite sides and extend far enough in to give the desired lateral play to the ball-like ends of the yoke 6. In this modification, the two sides of the head 13 are connected adjacent to a central hub, so that the head is, in effect, of disk form. The other section of the universal coupling may be applied without modification to that form of head 13 shown in Figs. 9 and 10. While perhaps the same range of movement may not be attained in the particular form shown in Figs. 9 and 10 that is possible in the construction shown in Figs. 1 to 8, nevertheless a sufficient range of movement is afforded to provide a universal connection of the same type and of the same efficiency.

It is, of course, immaterial which shaft 1 or 2 is employed as the driving shaft, since power may be applied through either equally well.

What I claim is:

1. In a universal coupling, two shaft ends, two sections, one of said sections being hinged to one shaft end the other section having a transverse guide-way to receive the first-mentioned section to permit it to move laterally relatively thereto, and an anti-friction device coöperatively connecting both of said sections.

2. In a universal coupling, two shaft ends, two sections, one of said sections being hinged to one shaft end and carrying an anti-friction ball-like member, the other section being secured to the other shaft end and having a groove therein to receive said anti-friction member between the two walls of said groove whereby a relative lateral movement of said ball-like member and the walls of said groove may be effected as the shaft ends are rotated.

3. In a universal coupling, two shaft ends, two sections, one of said sections being hinged to one shaft end, the other section having a transverse guide-way to receive the first-mentioned section to permit it to move laterally thereof, and two anti-friction devices rotatably and slidably mounted on the first-mentioned section and being operatively connected at all times with the second-mentioned section.

4. In a universal coupling, two shaft ends, a two-arm member hinged to one shaft end, a head secured to the other shaft end having a transverse guide-way therein, the two ends of the two-arm member having a bearing in said guide-way.

5. In a universal coupling for two shafts, a two-arm member hinged to one shaft end, a head secured to the other shaft end and having a transverse guide-way therein, the two ends of the two-arm member having a bearing in said guide-way, said bearing including anti-friction balls arranged to rotate and slide on said ends.

6. In a universal coupling for shafts, two sections, one of said sections having a transverse guide-way, two anti-friction end bearings carried by the other section, portions of said bearings being located in said guide-way and having a bearing against the walls thereof.

HERMAN DOCK.

Witnesses:
ERNEST L. CRANDALL,
ALBERT S. WOOD.